United States Patent Office.

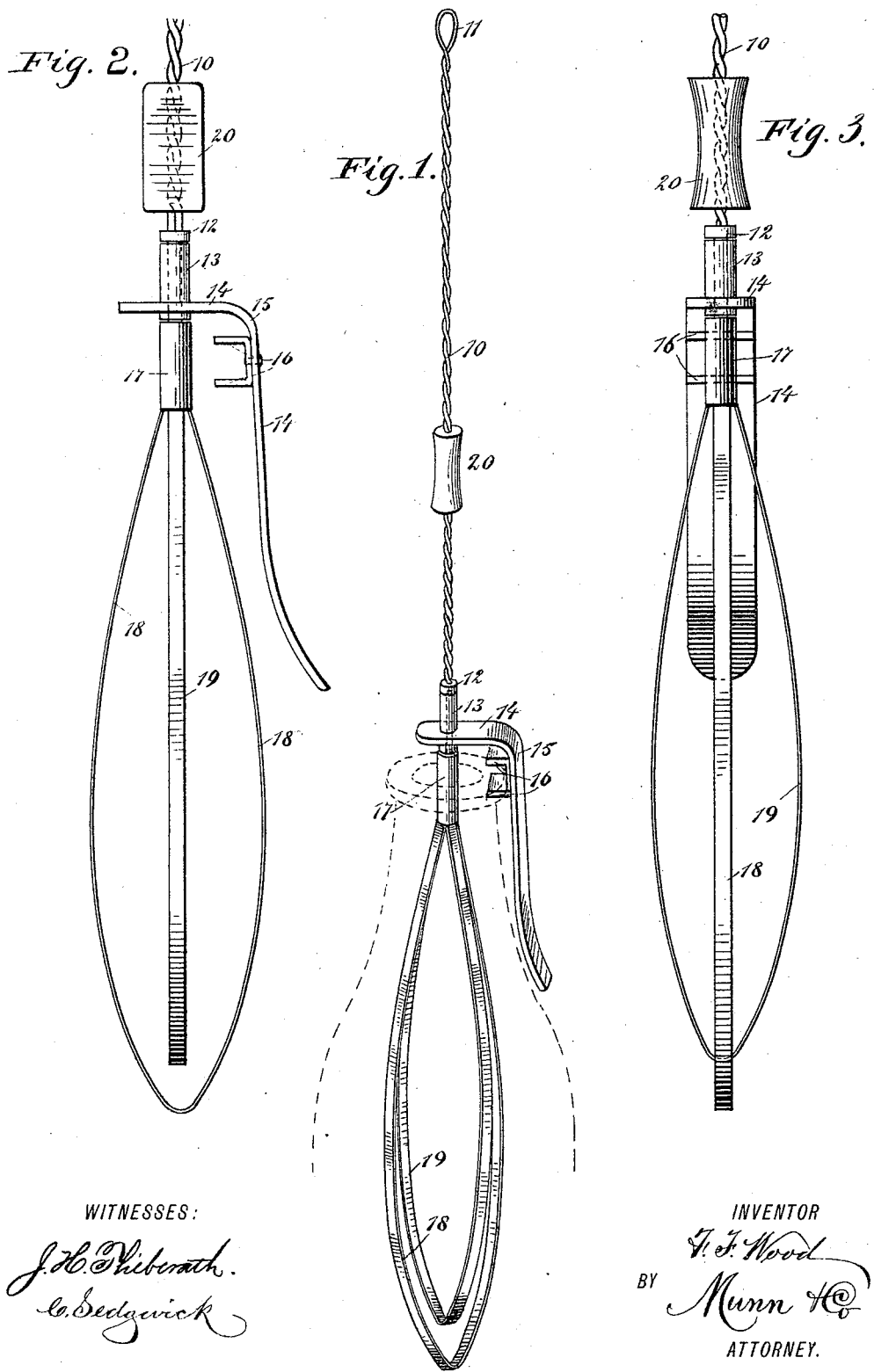

FRANCES FISHER WOOD, OF NEW YORK, N. Y.

AGITATOR.

SPECIFICATION forming part of Letters Patent No. 459,668, dated September 15, 1891.

Application filed May 1, 1891. Serial No. 391,193. (No model.)

*To all whom it may concern:*

Be it known that I, FRANCES FISHER WOOD, of the city, county, and State of New York, have invented a new and Improved Agitator, of which the following is a full, clear, and exact description.

My invention relates to improvements in agitators, and is especially intended for use in agitating sterilized milk which is held in bottles, although it may be used for agitating other liquids.

The object of my invention is to produce a simple and convenient agitator of this class which may be easily inserted into an ordinary bottle and which may be operated so that it will quickly cause the ingredients in the bottle to be thoroughly mingled.

The agitator is especially valuable for use in bottles containing sterilized milk, as where the milk has been kept for a long time the cream separates from it and it is necessary to have the cream and milk mingled before use.

To this end my invention consists in an agitator constructed substantially as hereinafter described and claimed.

Reference is to be had to the accompanying drawings, forming a part of this specification, in which similar figures of reference indicate corresponding parts in all the views.

Figure 1 is a perspective view of the agitator, showing the same as applied to a bottle, the bottle being indicated by dotted lines. Fig. 2 is a broken enlarged side elevation of the agitator, and Fig. 3 is a broken enlarged rear elevation of the same.

The agitator is provided with a screw-spindle 10, which, as shown in the drawings, is made of twisted wire, which terminates at its upper end in a loop 11; but the spindle may be made in any desired manner. The spindle is provided near its lower end with a collar 12, which rests upon the upper end of a sleeve 13, and this sleeve is formed integrally with the support 14, the support being intended to hold the spindle centrally in the neck of the bottle. The support 14 is bent downward and outward, as shown at 15, and immediately below the bend are inwardly-extending parallel lugs 16, which are adapted to press against the upper end of the bottle and thus hold the spindle in place. The spindle 10 is held to turn in the sleeve 13 and extends downward through the support 14 and terminates at its lower end in a head 17, to which are secured at its lower end the flexible and elliptical loops or blades 18 and 19. These loops are preferably made of spring metal, so that they may be easily flattened out and inserted in the neck of a bottle, and the loop 19 is made smaller than the loop 18 and is placed at right angles to the same, so that the loops, when secured to the head, as described, will form four blades, which are adapted to rotate around a vertical axis. The spindle 10 carries a nut 20, which is adapted to move longitudinally on the spindle and which is threaded internally to fit the thread of the spindle.

To operate the agitator the loops 18 and 19 are pushed downward into a bottle, and the flexibility of the loops enables them to flatten themselves and pass easily through the neck; but when they reach the larger portion of the bottle they will spring into shape, as shown in Fig. 1. The support 14 is adjusted upon the bottle-neck, and the nut 20 is then moved up and down upon the spindle. The support 14 prevents the spindle from moving vertically, and as the nut is held in the fingers so that it will not turn it acts upon the screw of the spindle and imparts to the same a rapid rotary motion, which is transmitted to the loops 18 and 19, and the revolution of the loops thoroughly agitates and mingles the material in the bottle. If desired, one of the loops at the lower end of the spindle may be dispensed with.

Having thus described my invention, what I claim as new, and desire to secure by Letters Patent, is—

In a device of the character described, the combination, with a revoluble spindle carrying loops at its lower end, of a support for the spindle, said support being bent downward and outward, as shown, and having on its inner side projecting lugs to fit a bottle-neck, substantially as described.

FRANCES FISHER WOOD.

Witnesses:
   WARREN B. HUTCHINSON,
   C. SEDGWICK.